United States Patent
Yu et al.

(10) Patent No.: US 9,258,183 B2
(45) Date of Patent: Feb. 9, 2016

(54) METHOD, DEVICE, AND SYSTEM FOR REALIZING DISASTER TOLERANCE BACKUP

(71) Applicant: Huawei Technologies Co., LTD, Shenzhen (CN)

(72) Inventors: Qinghua Yu, Shenzhen (CN); Chi Zhang, Beijing (CN); Sihai Ye, Shenzhen (CN); Deming Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 179 days.

(21) Appl. No.: 14/089,108

(22) Filed: Nov. 25, 2013

(65) Prior Publication Data

US 2014/0078887 A1  Mar. 20, 2014

Related U.S. Application Data

(63) Continuation of application No. PCT/CN2011/075066, filed on May 31, 2011.

(51) Int. Cl.
*H04L 12/24* (2006.01)
*H04L 12/26* (2006.01)
(Continued)

(52) U.S. Cl.
CPC ........ *H04L 41/0668* (2013.01); *H04L 43/0811* (2013.01); *H04L 43/10* (2013.01); *H04L 45/04* (2013.01); *H04L 45/28* (2013.01); *H04L 45/586* (2013.01)

(58) Field of Classification Search
CPC ..... H04L 41/0668; H04L 41/12; H04L 41/22; H04L 45/586
USPC .......................................... 370/219; 709/238
See application file for complete search history.

(56) References Cited

U.S. PATENT DOCUMENTS 7,136,931 B2 * 11/2006 Natarajan et al. .............. 709/238
7,835,270 B2 * 11/2010 Lei et al. ........................ 370/220

(Continued)

FOREIGN PATENT DOCUMENTS

CN  1567919 A  1/2005
CN  1859376 A  11/2006

(Continued)

OTHER PUBLICATIONS

"Extended European Search Report," Application No. 11795117.8, Applicant: Huawei Technologies Co., Ltd., mailing date Mar. 7, 2014, 6 pages.

(Continued)

*Primary Examiner* — Rasheed Gidado
(74) *Attorney, Agent, or Firm* — Slater & Matsil, L.L.P.

(57) ABSTRACT

Embodiments of the present invention provide a method, a device, and a system for realizing disaster tolerance backup. The method includes the following steps: a device with an active-standby function determines a current state of the device with the active-standby function, after it is determined that the current state is an active state, the device with the active-standby function issues reachable route information to a connected routing device, where the device with the active-standby function and a device of which a current state is a standby state have a same IP address, the reachable route information includes route information relevant to the IP address, so that the IP address is reachable, and the device with the active-standby function and the device of which the current state is the standby state are backup devices for each other. The present invention can realize remote disaster tolerance backup and avoid service interruption.

20 Claims, 12 Drawing Sheets

---

A device with an active-standby function determines a current state of the device with the active-standby function, where the current state includes an active state or a standby state — 11

After it is determined that the current state is the active state, the device with the active-standby function issues reachable route information to a connected route device, where the device with the active-standby function and a device of which a current state is the standby state have a same IP address, the reachable route information includes route information relevant to the IP address, so that the IP address is reachable through a route, and the device with the active-standby function and the device of which the current state is the standby state are backup devices for each other — 12

(51) Int. Cl.
  *H04L 12/715* (2013.01)
  *H04L 12/713* (2013.01)
  *H04L 12/703* (2013.01)

(56) References Cited

U.S. PATENT DOCUMENTS

| | | | |
|---|---|---|---|
| 7,859,992 B2 * | 12/2010 | Buchko et al. | 370/217 |
| 2007/0104198 A1 * | 5/2007 | Kalluri et al. | 370/392 |
| 2008/0215714 A1 | 9/2008 | Shimmura et al. | |
| 2010/0085972 A1 | 4/2010 | Yan et al. | |
| 2010/0098085 A1 * | 4/2010 | Wu et al. | 370/392 |
| 2010/0293293 A1 * | 11/2010 | Beser | 709/238 |

FOREIGN PATENT DOCUMENTS

| | | |
|---|---|---|
| CN | 101110832 A | 1/2008 |
| CN | 101227319 A | 7/2008 |
| CN | 101394260 A | 3/2009 |
| CN | 101404621 A | 4/2009 |
| CN | 100502384 C | 6/2009 |
| EP | 1489778 A1 | 12/2004 |
| EP | 1742430 A1 | 1/2007 |

OTHER PUBLICATIONS

Chinese Search Report for Application No. PCT/CN2011/075066, mailed Mar. 1, 2012, 11 pages.
Chinese Search Report for Application No. 2011800008775, mailed Jan. 18, 2013, 2 pages.
First Chinese Office Action for Application No. 201180000877.5, mailed Feb. 4, 2013, 6 pages.

* cited by examiner

METHOD, DEVICE, AND SYSTEM FOR REALIZING DISASTER TOLERANCE BACKUP

This application is a continuation of International Application No. PCT/CN2011/075066, filed on May 31, 2011, which is hereby incorporated by reference in its entirety.

TECHNICAL FIELD

The present invention relates to network communications technologies, and in particular, to a method, a device, and a system for realizing disaster tolerance backup.

BACKGROUND

To avoid service interruption, some key service processing devices in a network have backup devices. In addition, to meet a reliability requirement of the network, the backup devices usually need to be deployed remotely. Therefore, in the network, a disaster tolerance solution for the devices deployed remotely is required.

Currently, a dual-host disaster tolerance technology may adopt a virtual route redundancy protocol (VRRP) solution, in which a virtual router needs to be created in the network, and the virtual router is composed of an active router and several standby routers. Both the active router and the standby routers need to receive an address resolution protocol (ARP) request packet sent by a host, and then, the active router makes a response. In this solution, the active router and the standby routers are required to be located in a same layer 2 switching network. However, the devices deployed remotely usually interwork in a layer 3 switching network and a remote layer 2 switching network is difficult to be provided, so the VRRP solution is not suitable for remote disaster tolerance. In addition, for the remote disaster tolerance, a manner of configuring different IP addresses for an active device and standby devices can be adopted. This manner needs to configure, on a host, IP addresses corresponding to the active device and the standby devices, and after the active device is abnormal, an IP address of a standby device is automatically switched to and used. Therefore, this solution has a capacity requirement for the device, and after the IP address is changed, a connection needs to be reestablished, which may cause service interruption.

SUMMARY OF THE INVENTION

Embodiments of the present invention provide a method, a device, and a system for realizing disaster tolerance backup, which can realize remote disaster tolerance backup.

An embodiment of the present invention provides a method for realizing disaster tolerance backup, including determining a current state of a device with an active-standby function, where the current state includes an active state or a standby state, and after it is determined that the current state is the active state, issuing reachable route information to a connected routing device, where the device with the active-standby function and a device of which a current state is the standby state have a same IP address, the reachable route information includes route information relevant to the IP address, so that the IP address is reachable through a route, and the device with the active-standby function and the device of which the current state is the standby state are backup devices for each other.

An embodiment of the present invention provides a device for realizing disaster tolerance backup, including a determining module, configured to determine a current state of the device for realizing disaster tolerance backup, where the current state includes an active state or a standby state, and an issuing module, configured to: after it is determined that the current state is the active state, issue reachable route information to a connected routing device, where the device for realizing disaster tolerance backup and a device of which a current state is the standby state have a same IP address, the reachable route information includes route information relevant to the IP address, so that the IP address is reachable through a route, and the device for realizing disaster tolerance backup and the device of which the current state is the standby state are backup devices for each other.

An embodiment of the present invention provides a system for realizing disaster tolerance backup, including an active device that has a same IP address as a standby device having a backup relationship with the active device, and a first routing device connected to the active device, where the active device is configured to issue reachable route information to the first routing device, where the reachable route information includes route information relevant to the IP address, so that the IP address is reachable through a route, and the first routing device is configured to: after receiving the reachable route information, send a received packet to the active device through a path between the first routing device and the active device.

It can be known from the technical solutions above, in the embodiments of the present invention, reachable route information is issued to a routing device through an active state device, the reachable route information is information indicating a packet transmission path, so a bearer network including the routing device is enabled to send a packet to the active state device according to the reachable route information, rather than sending the packet to a standby state device incapable of processing the packet, thereby realizing backup disaster tolerance. In this solution, the active state device issues the reachable route information actively, and it is not required that the active device makes an ARP response after the active device and the standby device receive the ARP request, and the reachable route information is issued by using a layer 3 protocol message, so that it is not limited that the active device and the standby device are located in a same layer 2 switching network in the embodiments of the present invention, thereby avoiding the limitation caused by a VRRR solution, and realizing remote disaster tolerance. In addition, the active device and the standby device in the embodiment of the present invention have the same IP address, so that a problem such as a high capacity requirement for the device and service interruption due to different IP addresses can be avoided.

BRIEF DESCRIPTION OF THE DRAWINGS

To describe the technical solutions in the embodiments of the present invention more clearly, the following briefly introduces accompanying drawings for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make objectives, technical solutions, and advantages of embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
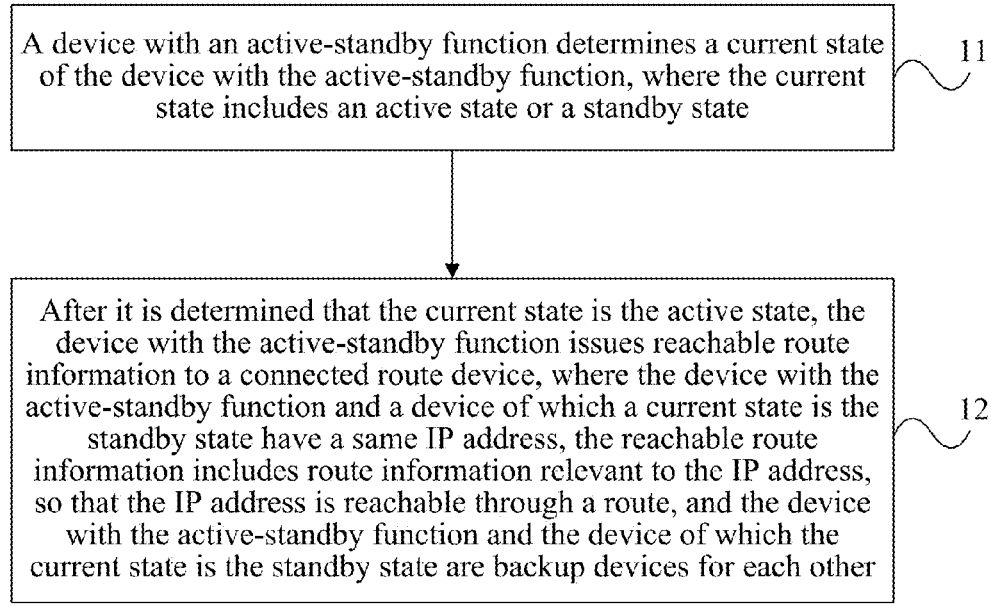
FIG. 1 is a schematic flow chart of an embodiment of a method for realizing disaster tolerance backup according to the present invention.
Figure 2:
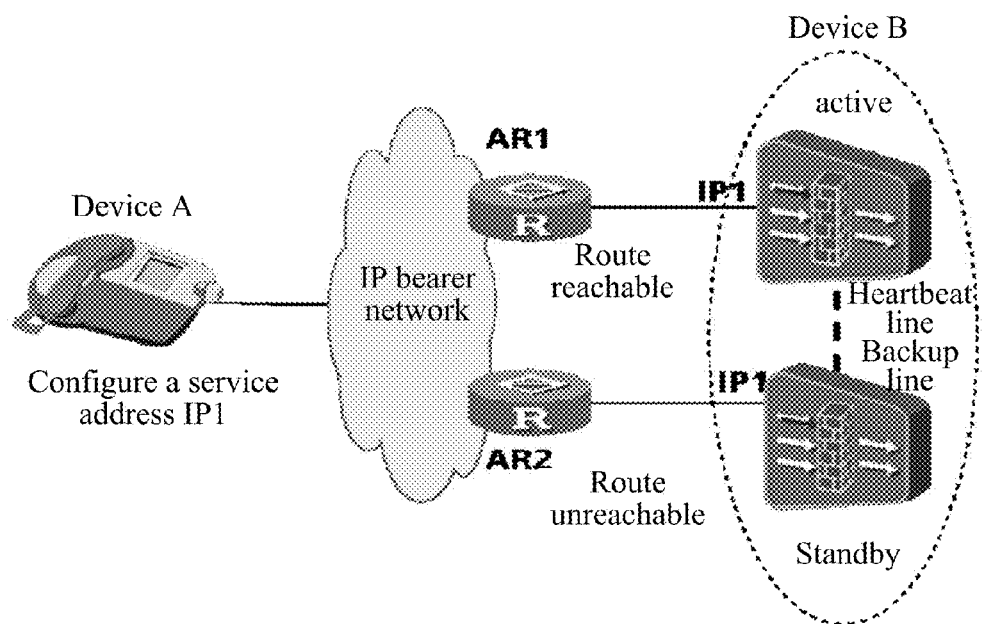
FIG. 2 is a schematic structural diagram of a system corresponding to FIG. 1.

FIG. 1 is a schematic flow chart of an embodiment of a method for realizing disaster tolerance backup according to the present invention; FIG. 2 is a schematic structural diagram of a system corresponding to FIG. 1. Referring to FIG. 1, this embodiment includes:

Step 11: A device with an active-standby function determines a current state of the device with the active-standby function, where the current state includes an active state or a standby state.

Referring to FIG. 2, it is supposed that device A communicates with device B through an IP bearer network and device B includes devices having a backup relationship. And any of the devices having the backup relationship in device B has the active-standby function, that is, the device is in the active state under a certain situation, and is in the standby state under another situation. After a condition is determined, one of the devices that have the active-standby function and are included in the device B is in the active state, and others are in the standby state. A case where device B includes two devices having the active-standby function is taken for example. Under a same condition, one is in the active state and the other is in the standby state; as shown in FIG. 2, the device in the active state can be called an active device, and the device in the standby state is called a standby device. One of the devices having the backup relationship is the device with the active-standby function. For example, device B includes a first device and a second device, where the first device and the second device all have an active-standby state. Under a certain condition, for example, during default configuration, the first device is the active device, the second device is the standby device; while under another condition, for example, a failure occurs when the first device acts as the active device, the first device is switched to the standby device, and the second device is switched to the active device. The first device or the second device is the device with the active-standby function. If the current state is the active state, the device acts as the active device; if the current state is the standby state, the device acts as the standby device.

The current state may be determined according to the default configuration, and can also be determined according to a heartbeat packet transmitted between the active device and the standby device. In addition, active-standby switching can also be realized according to the heartbeat packet. Referring to FIG. 2, a heartbeat line may be included between the active device and the standby device, and the heartbeat line is used for transmitting the heartbeat packet. Specifically, the heartbeat line may be a transport control protocol (Transport Control Protocol, TCP) connection or user datagram protocol (User Datagram Protocol, UDP) connection. In addition, the active device may transmit backup data such as current service information or terminal information to the standby device. Therefore, a backup line may also exist between the active device and the standby device, and the backup line is used for transmitting the backup data. Specifically, the backup line may be a TCP connection or a UDP connection.

For details of active-standby state determination and active-standby switching, reference may be made to the following embodiment.

Step 12: After it is determined that the current state is the active state, the device with the active-standby function issues reachable route information to a connected routing device, where the device with the active-standby function and a device of which a current state is the standby state have a same IP address, the reachable route information includes route information relevant to the IP address, so that the IP address is reachable through a route, and the device with the active-standby function and the device of which the current state is the standby state are backup devices for each other.

The routing device may include a router and a layer 3 switch, specifically, the router may also be an access router (Access Router, AR). Referring to FIG. 2, a case where the routing device is an AR is taken for example in the embodiment of the present invention. It is supposed that an AR connected to the active device is a first AR (AR1), and an AR connected to the standby device is a second AR (AR2).

The reachable route information indicates that a corresponding path is reachable, which may make the IP bearer network route the packet to the device that issues the reachable route information. Therefore, after receiving the reachable route information, the routing device may send the packet to the active device according to the reachable route information.

Referring to FIG. 2, the issuing reachable route information may be issuing route reachable information, for example, an external border gateway protocol (External Border Gateway Protocol, eBGP) is used for issuing the route reachable information. The issuing reachable route information may also be validating a static route to the connected routing device, so that the route to the connected routing device can be in use, for example, a bidirectional forwarding detection (Bidirectional Forwarding Detection, BFD) session is activated, where the BFD session is bound with the static route between the device with the active-standby function and the routing device, and due to the binding of the device with the active-standby function and the routing device, after the BFD session is activated, the bound static route is validated. And the issuing reachable route information may also be sending first route priority information to the connected routing device, where a priority corresponding to the first route priority information is higher than a priority corresponding to second route priority information, and the second route priority information is issued by the device in the standby state. In this case, the routing device routes the packet to a device corresponding to a route with a higher priority according to a route priority.

The foregoing active device and standby device may have the same IP address, for example, referring to FIG. 2, the same IP address is IP1, and the reachable route information is route information for IP1. In this case, only one IP address needs to be configured on device A, that is, the service address IP1 is configured.

Further, when the device with the active-standby function determines that the current state is the standby state, the method further includes: issuing route unreachable information to the connected routing device or not issuing route information; or invalidating the static route to the connected routing device, so that the route to the connected routing device cannot be used, for example, deactivating the BFD session between the device with the active-standby function and the connected routing device; or sending the second route priority information to the connected routing device, where the priority corresponding to the second route priority information is lower than the priority corresponding to the first route priority information. The first route priority information is issued by the device in the active state. For example, referring to FIG. 2, the standby device issues the route unreachable information.

In addition, the route information relevant to the IP address may include: the route information including the IP address, or the route information including network section information of a network section to which the IP address belongs. That is, the reachable route information may include the foregoing IP address, and may also include the information relevant to the IP address, such as the network section information, so that the IP address is reachable through a route.

The foregoing backup devices for each other may be service data backups for each other or configuration information backups for each other. For example, the backup devices for each other save to-be-backed-up data, where the to-be-backed-up data includes at least one of the following items: service data, configuration information, registration information, and call information.

In this embodiment, the device with the active-standby function issues the reachable route information to notify the bearer network of performing routing correspondingly, and an ARP response does not need to be sent to a host to determine a corresponding route. Therefore, this embodiment does not limit that the active device and the standby device are located in a same layer 2 switching network. This embodiment can be implemented in a remote disaster tolerance solution. That is, the active device and the standby device in this embodiment may be deployed in different layer 2 switching networks as long as the active device and the standby device interwork at layer 3. In addition, the active device and the standby device in this embodiment have the same IP address, which can avoid a problem such as a high capacity requirement for the device and service interruption due to the different IP addresses. The foregoing layer 2 switching network is a layer 2 switching network in a data communications field, a same layer 2 switching network may be a same broadcast domain.

A case of issuing the route information by using a dynamic routing protocol, a static routing protocol, or a routing priority is described in the following.

Figure 3:
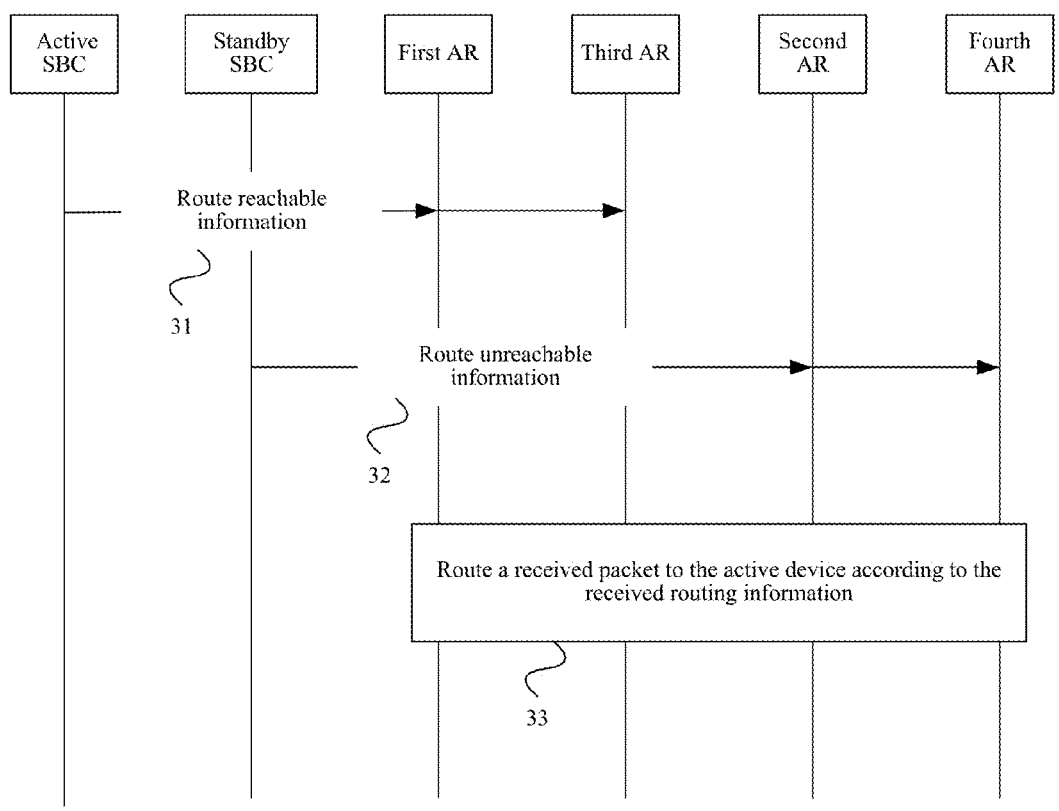
FIG. 3 is a schematic flow chart of another embodiment of a method for realizing disaster tolerance backup according to the present invention.

FIG. 3 is a schematic flow chart of another embodiment of a method for realizing disaster tolerance backup according to the present invention. In this embodiment, an external dynamic routing protocol is taken for example.

Figure 4:
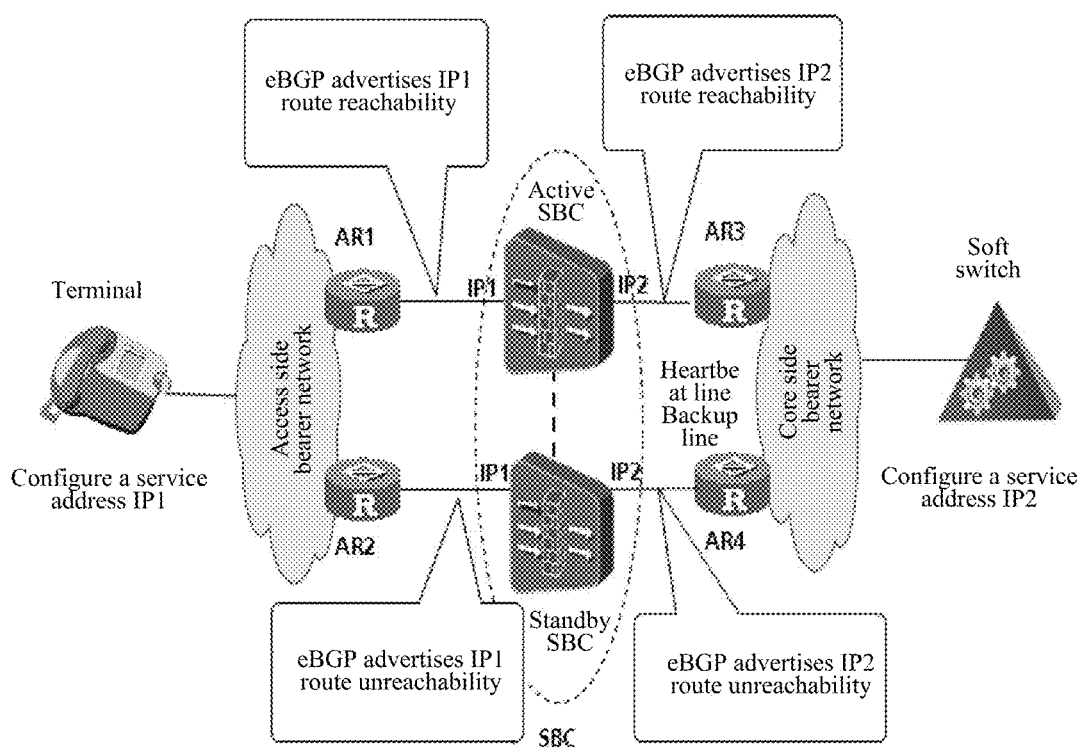
FIG. 4 is a schematic structural diagram of a system corresponding to FIG. 3.

FIG. 4 is a schematic structural diagram of a system corresponding to FIG. 3. Referring to FIG. 4, in this embodiment, a case where a device with an active-standby function acts as a session border controller (Session Border Controller, SBC) is taken for example. The active device and standby device are an active SBC and a standby SBC respectively. The active SBC and the standby SBC have a same IP address on a same network side, for example, the active SBC and the standby SBC communicate with a terminal accessed through an access side bearer network by using IP1; the active SBC and the standby SBC communicate with a softswitch device accessed through a core side bearer network by using IP2. In this embodiment, a case where an SBC has different IP addresses on an access side and a core side is taken for example, and the SBC may also have a same IP address on the access side and the core side. The access side bearer network includes a first AR (AR1) connected to the active SBC and a second AR (AR2) connected to the standby SBC, and the core side bearer network includes a third AR (AR3) connected to the active SBC and a fourth AR (AR4) connected to the standby SBC. In this embodiment, the active SBC issues route reachable information to ARs connected to the active SBC, and the standby SBC issues route unreachable information to ARs connected to the standby SBC.

Referring to FIG. 3, this embodiment includes:

Step 31: The active SBC issues the route reachable information to the first AR and the third AR.

The active SBC may use the dynamic routing protocol to issue the route reachable information. For example, when using eBGP, the active SBC may send a first eBGP message to the first AR and the third AR, where the first eBGP message includes route indication information indicating that IP1 is reachable.

Step 32: The standby SBC issues the route unreachable information to the second AR and the fourth AR.

The standby SBC may use the dynamic routing protocol to issue the route unreachable information. For example, when using eBGP, the standby SBC may send a second eBGP message to the second AR and the fourth AR, where the second eBGP message includes route indication information indicating that IP2 is unreachable.

Definitely, the dynamic routing protocol used by the active SBC and the standby SBC is not limited to eBGP. The dynamic routing protocol may also be other dynamic routing protocols, such as OSPF and RIP.

In addition, step 31 and step 32 have no sequence limitation relationship.

Step 33: An AR routes a received packet to an active device according to received routing information.

For example, when the first AR receive the route reachable information, the first AR may determine that a route to a device connected to the first AR can be used; and then, the first AR routes a packet, received from the terminal, to the device connected to the first AR. The device connected to the first AR is the active SBC. When the second AR receives the route unreachable information, the second AR may determine that a route to a device connected to the second AR cannot be used, that is a route between the second AR and the standby SBC cannot be used. In this case, after receiving a packet sent by the terminal, the second AR may perform dynamic routing inside the bearer network, and the packet is sent to the active SBC from the second AR through the first AR. The core network side may also adopt a similar processing procedure, for example, when the third AR receive the route reachable information, the third AR may determine that a corresponding routing path can be used, and then, a packet sent by the softswitch device is sent to the active SBC through a path between the third AR and the active SBC; when the fourth AR receives the route unreachable information, the fourth AR may determine that a path between the fourth AR and the standby SBC cannot be used, and then, by adopting dynamic routing inside the bearer network, a packet that is received by the fourth AR and sent by the softswitch device may be sent to the active SBC through the third AR.

In addition, the active device and the standby device may be switched, for example, after a failure occurs on the active SBC, an eBGP TCP connection between the active device and the first AR is broken, the first AR automatically deletes a route of IP1 of the active SBC. At the same time, the standby SBC may sense, through a heartbeat packet, that a failure occurs on the active SBC, upgrades itself to an active device, establishes a eBGP TCP connection with the second AR, and issues IP1 route reachability externally, so that data sent by the access side is routed to the new active SBC again, where the new active SBC is obtained by upgrading the original standby SBC. On the core network side, a similar processing procedure may also be adopted. The active SBC and the standby SBC have the same IP address, so during the active-standby switching, the IP address is not changed, a connection does not need to be established with a new IP address, so that the terminal does not sense the switching, thereby avoiding service interruption. For the to-be-backed-up data, it may be that the active SBC sends the to-be-backed-up data to the standby SBC through a connection corresponding to a standby line, for example, upon obtaining the to-be-backed-up data, the active SBC sends the to-be-backed-up data to the standby SBC through a UDP or TCP connection. For example, after obtaining the to-be-backed-up data, the active SBC sends the to-be-backed-up data to the standby SBC after a period of T time, where the T time is set time. The T time may be set to different values according to different scenarios. The to-be-backed-up data may be service data, configuration information, registration information, call information or the like.

Further, based on a requirement for consistency of the service access side and the core side, synchronized joint active and standby switchover may be adopted. For example, a failure occurs between the first AR and the active SBC, IP2 unreachability can be jointly issued between the active SBC and the third AR, so that services of IP1 and IP2 are switched over onto the standby SBC.

In this embodiment, by issuing reachable route information externally, a bearer network is enabled to route a packet to an active router according to the reachable route information. In this solution, the active device issues the reachable route information actively, and it is not required that the active device makes an ARP response after the active device and the standby device receive an ARP request. The reachable route information may be issued by using a layer 3 protocol message, and it is not limited that the active device and the standby device are in a same layer 2 switching network. And as a result, limitation caused by a VRRR solution can be avoided, and remote disaster tolerance can be realized. In addition, in this embodiment, the active device and the standby device have the same IP address, so that the terminal and a core network device does not sense the switching during the switching, thereby avoiding service interruption. In addition, in this embodiment, a dynamic protocol is adopted for issuing the reachable route information, which is suitable to a scenario of a dynamic routing protocol.

Figure 5:
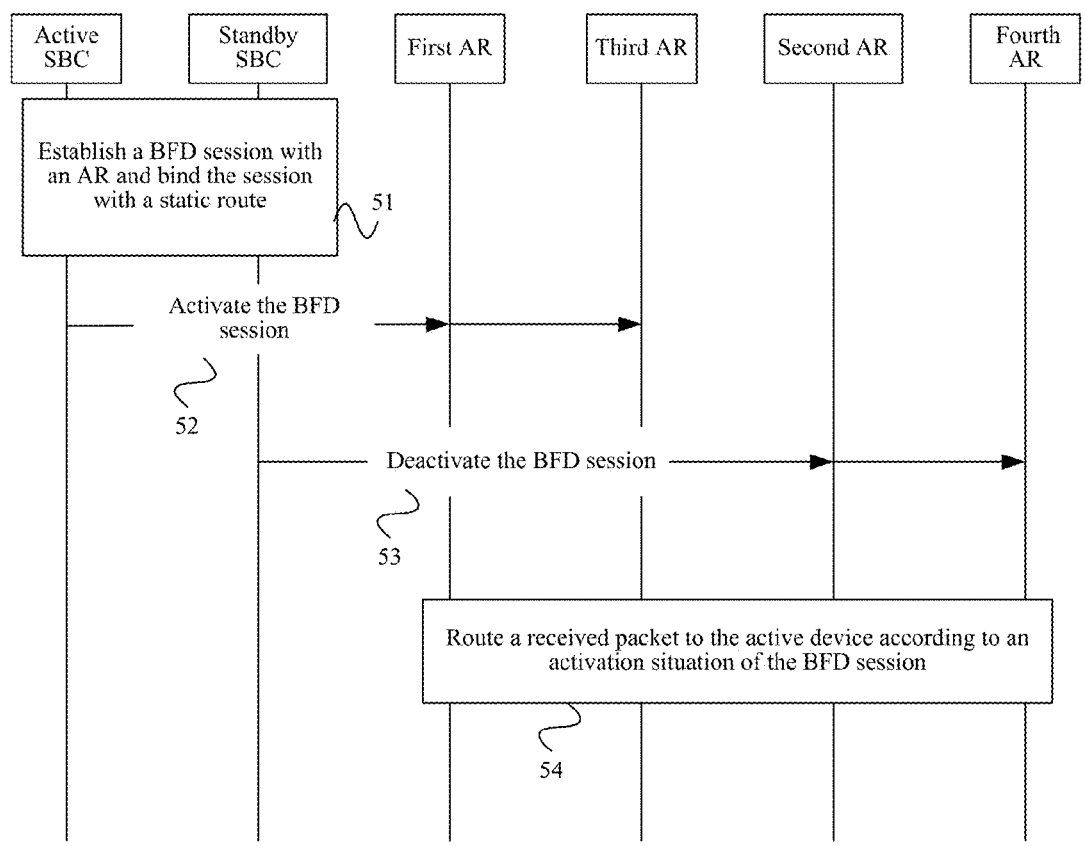
FIG. 5 is a schematic flow chart of another embodiment of a method for realizing disaster tolerance backup according to the present invention.

FIG. 5 is a schematic flow chart of another embodiment of a method for realizing disaster tolerance backup according to the present invention. In this embodiment, an external static routing protocol is taken for example.

Figure 6:
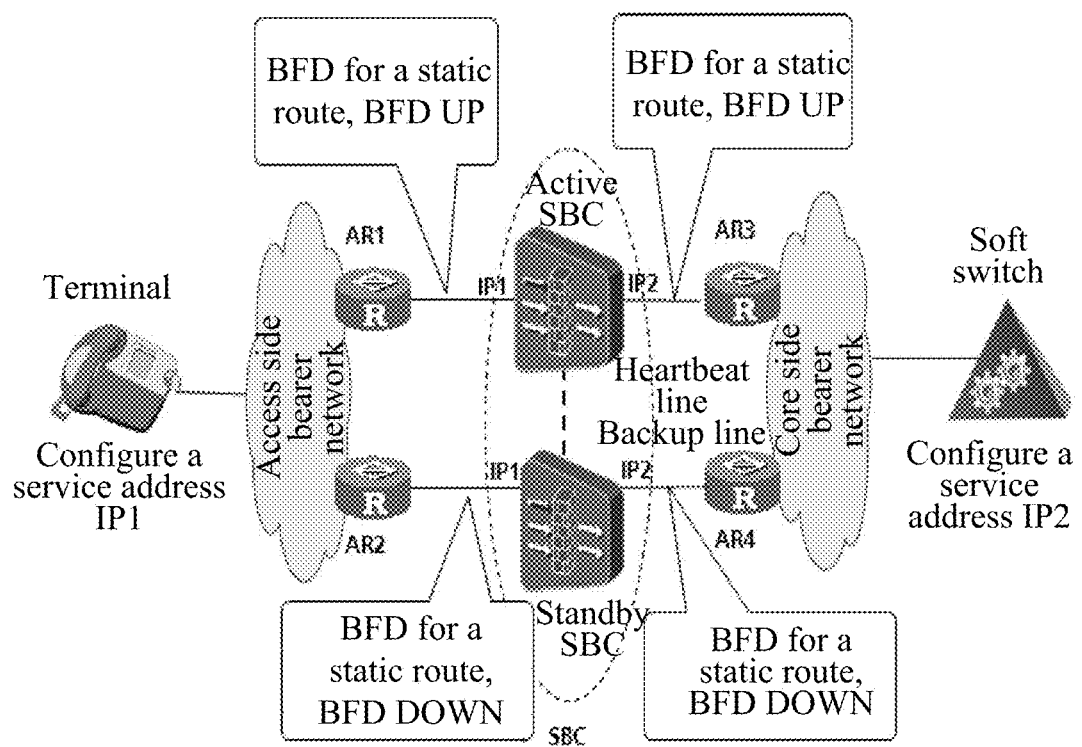
FIG. 6 is a schematic structural diagram of a system corresponding to FIG. 5.

FIG. 6 is a schematic structural diagram of a system corresponding to FIG. 5. Different from the embodiment shown in FIG. 4, in this embodiment, a route between an SBC and an AR is a static route. Specifically, the SBC device and an IP bearer network router are connected to each other through the static route. That is, a static route to IP1 of an active SBC is configured on a first AR, a static route to IP1 of a standby SBC is configured on a second AR, a static route to IP2 of the active SBC is configured on a third AR, and a static route to IP2 of the standby SBC is configured on a fourth AR.

Between the SBC and the AR router, a BFD failure detection mechanism can be enabled, and a BFD session is bound with a static route to the SBC on the router. BFD sessions on an access side and a core side performed by the active SBC are all UP, BFD sessions on the access side and the core side performed by the standby SBC are all DOWN. In this case, for the access side ARs and the core side ARs, only static routes to the active SBC are activated, and routes to the standby SBC are deactivated. An initial active or standby state of the SBC is determined by configuration data and a heartbeat arbitration mechanism. Under a normal situation, traffic for accessing the SBC by the terminal and a soft switch is all routed to the active SBC.

In addition, a failure detection mechanism between the AR and the SBC is not merely limited to the BFD mechanism, various failure detection mechanisms such as PING, ARP, operation administration and maintenance (Operation Administration and Maintenance, OAM) may also be used. If another failure detection mechanism is used, the static routes are bound with the failure detection mechanism correspondingly on the AR and the SBC, and the remaining procedure is not changed.

Referring to FIG. 5, this embodiment includes:

Step 51: An SBC establishes a BFD session with a connected AR and binds the session with a static route.

For example, the active SBC establishes BFD sessions with the first AR and the third AR, where each BFD session is bound with a corresponding static route. The standby SBC establishes BFD sessions with the second AR and the forth AR, where each BFD session is bound with a corresponding static route.

Step 52: The active SBC activates the BFD sessions between the first AR and the active SBC and between the third AR and the active SBC.

Because the static route is bound with the BFD session, after the BFD session is activated (UP), it indicates that the static route bound with the BFD session is reachable. The active SBC activates a BFD session between the active SBC and an AR connected to the active SBC, thereby implementing that the static route to IP1 of the active SBC configured on the first AR is validated, and the active SBC is reachable through a route.

Step 53: The standby SBC deactivates the BFD sessions between the second AR and the standby SBC and between the fourth AR and the standby SBC.

Because the static route is bound with the BFD, after the BFD session is deactivated (down), it indicates that the static route bound with the BFD session is unreachable. The standby SBC deactivates a BFD session between the standby SBC and an AR connected to the standby SBC, thereby implementing that the standby SBC is unreachable.

In addition, step 52 and step 53 have no sequence limitation relationship.

Step 54: An AR routes a received packet to the active device according to an activation situation of a BFD session.

For example, when a BFD session on the first AR is activated, it may be determined that a static route to a device connected to the first AR is valid, and then, a packet received from the terminal is routed to the device corresponding to the valid route. The device connected to the first AR is the active SBC. When a BFD session on the second AR is deactivated, it may be determined that a static route to a device connected the second AR to is invalid, and then, by using the dynamic routing protocol inside the bearer network, a packet received from the terminal is routed to the active SBC through the first AR. When a system is initially configured, each AR can acquire information of each backup device, so as to route a packet to a required backup device. The core network side may also adopt a similar processing procedure, for example, when a BFD session on the third AR is activated, it may be determined that a corresponding path is valid, and then, a packet received from a softswitch device is routed to the active SBC through the valid path; when a BFD session on the fourth AR is deactivated, it may be determined that a corresponding path is invalid, and then, by using the dynamic routing protocol inside the bearer network, a packet received from the softswitch device is routed to the active SBC through the third AR.

In addition, the active device and the standby device may be switched, for example, after a failure occurs on the active SBC, the active device deactivates the BFD session between the first AR and the active device, the first AR deactivates the static route to IP1 of the active SBC actively. At the same time, the standby SBC may sense, through the heartbeat packet, that a failure occurs on the active SBC, upgrades itself to an active device, activates the BFD session between the second AR and the standby SBC, so that data sent by the access side is routed to the standby SBC which upgrades to the active SBC. On the core network side, a similar processing procedure may also be adopted.

Further, based on a requirement for consistency of the service access side and the core side, synchronized joint active and standby switchover may be adopted. For example, a failure occurs between the first AR and the active SBC, the BFD session between the active SBC and the third AR may be jointly deactivated, so that services of IP1 and IP2 are switched over onto the standby SBC.

In a VRRP solution, a host sends an ARP request to the active device and the standby device, and then the active device responds to the ARP request. The VRRP solution requires that both the active device and the standby device receive the ARP request, so the VRRP solution requires that the active device and the standby device are located in a same layer 2 switching network. However, in this embodiment, by issuing the reachable route information external, a bearer network is enabled to route a packet to an active router according to the reachable route information. In this solution, the active device issues the reachable route information actively, and it is not required that the active device makes an ARP response after the active device and the standby device receive the ARP request. The reachable route information may be issued by using a layer 3 protocol message, and it is not limited that the active device and the standby device are in a same layer 2 switching network. And as a result, limitation caused by a VRRR solution can be avoided, and remote disaster tolerance is realized. In addition, in this embodiment, the active device and the standby device have the same IP address, so that the terminal and a core network device does not sense the switching during the switching, thereby avoiding service interruption. In addition, in this embodiment, a static protocol for issuing the reachable route information is adopted, which is suitable to the scenario of the static routing protocol.

Figure 7:
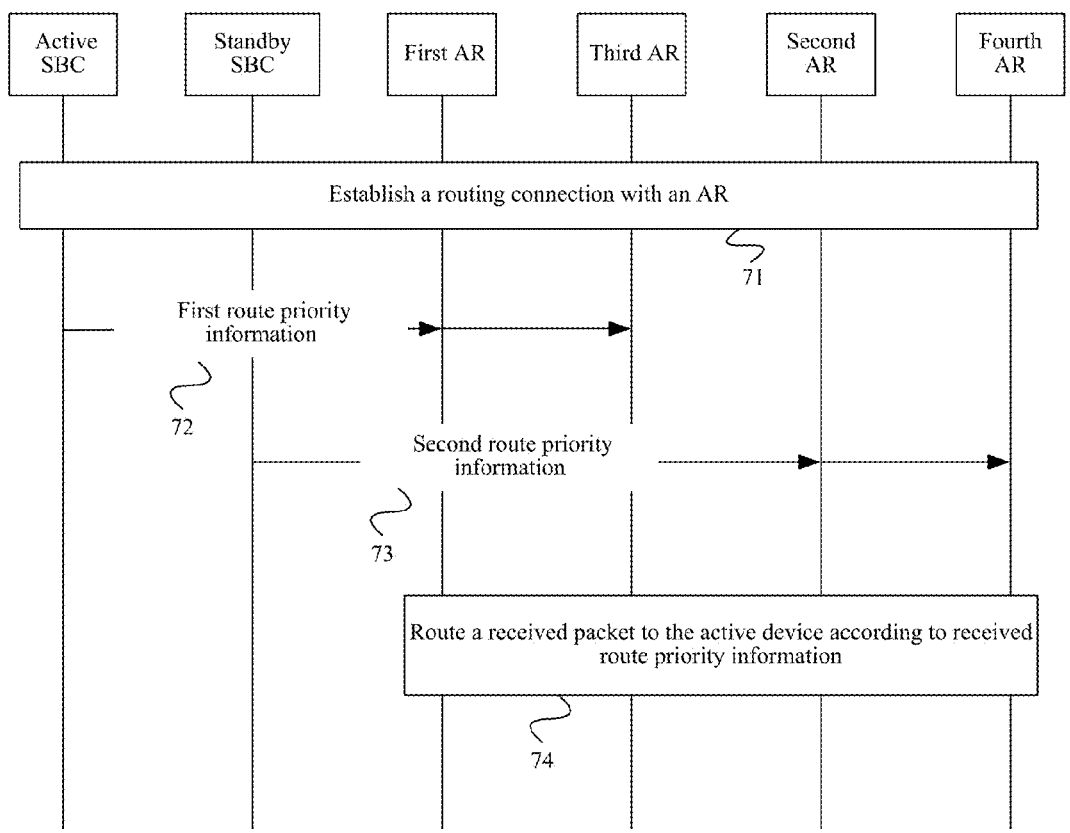
FIG. 7 is a schematic flow chart of another embodiment of a method for realizing disaster tolerance backup according to the present invention.

FIG. 7 is a schematic flow chart of another embodiment of a method for realizing disaster tolerance backup according to the present invention. In this embodiment, a case where a route priority is issued externally is taken for example.

Figure 8:
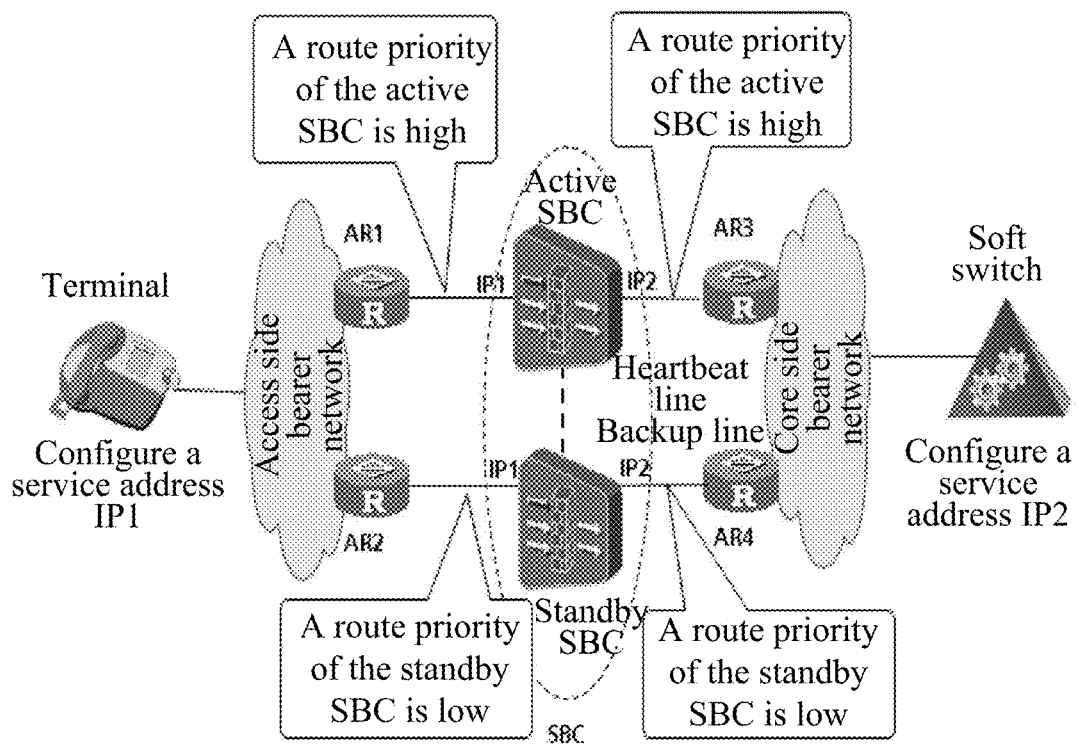
FIG. 8 is a schematic structural diagram of a system corresponding to FIG. 7.

FIG. 8 is a schematic structural diagram of a system corresponding to FIG. 7. Different from the embodiments shown in FIG. 4 and FIG. 6, in this embodiment, an active SBC and a standby SBC are both reachable through a route. However, a route priority of the active SBC is higher than a route priority of the standby SBC, and during packet forwarding, a packet is forwarded to an SBC device with a high route priority, so that the packet is forwarded to the active SBC. Specifically, the SBC device is connected externally to an IP bearer network router by using a static route or a dynamic route. Route priorities of the active SBC on an access side and a core side is high, and route priorities of the standby SBC on the access side and the core side is low. That is, the route priorities of the active SBC with IP1 on the access side and IP2 on the core side is high, and the route priorities of the standby SBC with IP1 on the access side and IP2 on the core side is low. An initial active or standby state of the SBC is determined by configuration data and a heartbeat arbitration mechanism. Under a normal situation, because the route priority of the active SBC is high, traffic for accessing the SBC by the terminal and a soft switch is all routed to the active SBC.

Referring to FIG. 7, this embodiment includes:

Step 71: An SBC establishes a routing connection with an AR.

For example, the routing connection is established by adopting a dynamic routing protocol or a static routing protocol.

Step 72: The active SBC sends first route priority information to a first AR and a third AR.

Step 73: The standby SBC sends second route priority information to a second AR and a fourth AR.

A first route priority is higher than a second route priority. Route priority information may include a corresponding IP address.

In addition, step 72 and step 73 have no sequence limitation relationship.

Step 74: An AR routes a received packet to the active device according to received route priority information.

For example, an AR forwards a packet to a device corresponding to a routing path with a high route priority, so that the packet can be forwarded to the active device.

In addition, when a failure occurs on the active SBC, the first AR can delete a dynamic route or deactivate a static route, so that data is routed to the standby SBC, and the active-standby switching is realized.

In this embodiment, by issuing reachable route information externally, a bearer network is enabled to route a packet to an active router according to the reachable route information. In this solution, the active device issues the reachable route information actively, it is not required that the active device makes an ARP response after the active device and the standby device receive an ARP request. The reachable route information may be issued by using a layer 3 protocol message, and it is not limited that the active device and the standby device are in a same layer 2 switching network. And as a result, limitation caused by a VRRR solution can be avoided, and remote disaster tolerance can be realized. In addition, in this embodiment, the active device and the standby device have the same IP address, so that a terminal and a core network device does not sense the switching during the switching, thereby avoiding service interruption. In addition, this embodiment is applicable to a scenario where the active device and the standby device are determined by the route priority.

In the foregoing embodiments, the current state of the device with the active-standby function may be determined by adopting the following manner.

Figure 9A:
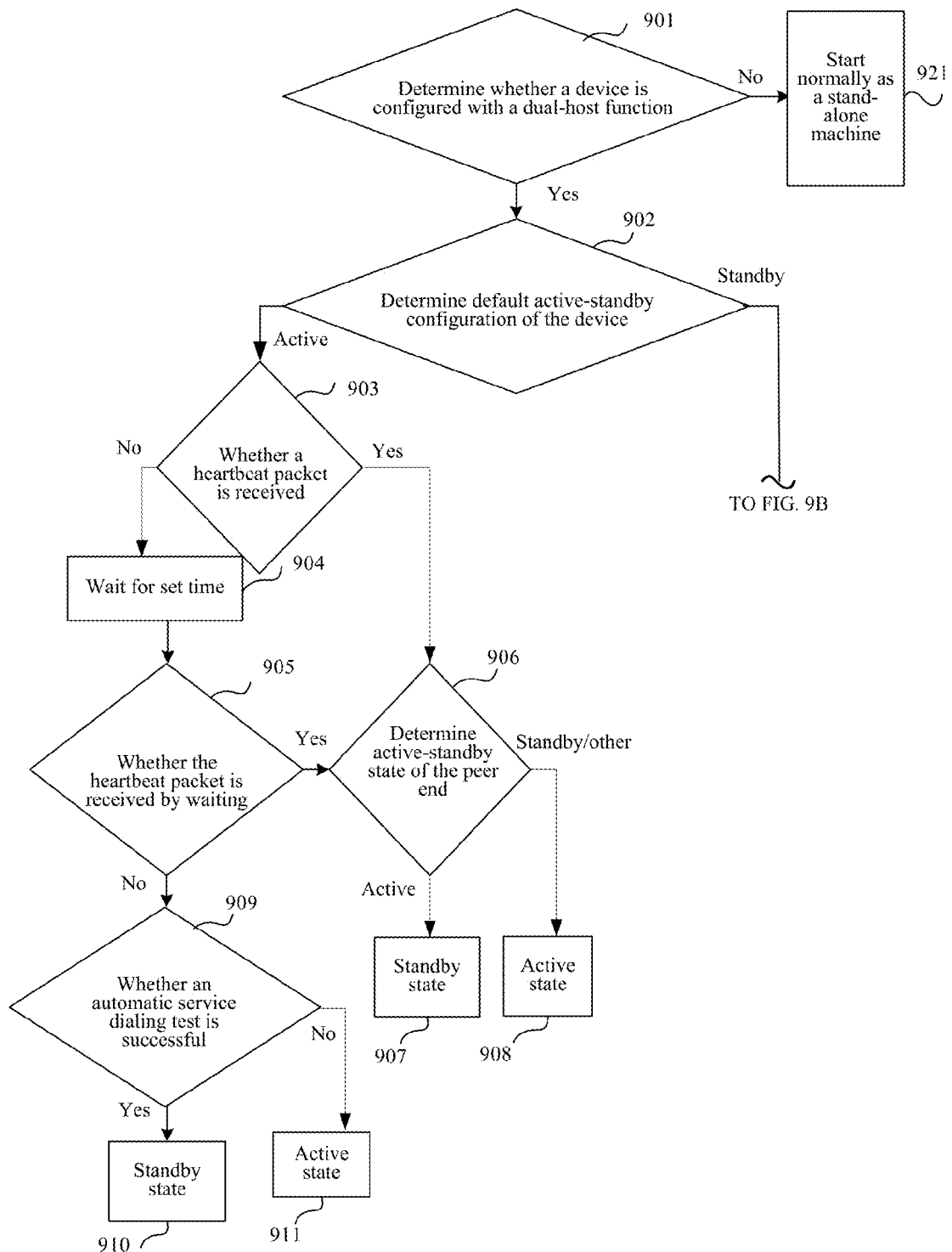
FIG. 9A and FIG. 9B are a schematic flow chart of determining an active-standby state according to an embodiment of the present invention.
Figure 9B:
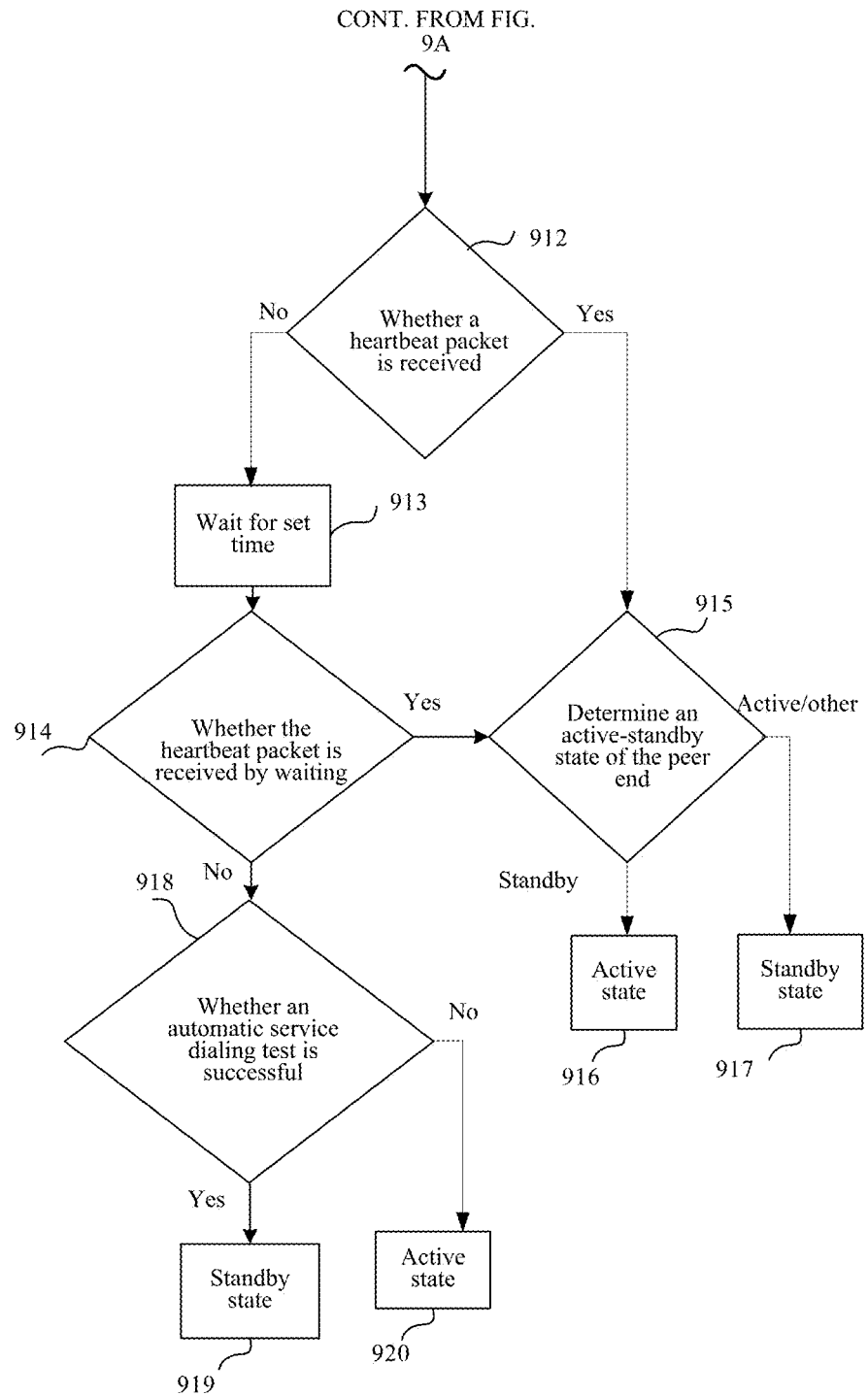

FIG. 9A and FIG. 9B are a schematic flow chart of determining an active-standby state according to an embodiment of the present invention, which includes the followings.

Step 901: Determine whether a device with an active-standby function is configured with a dual-host function, and if yes, execute step 902; otherwise, execute step 921.

The dual-host function refers to an active-standby function. Through configuration, the device with the active-standby function can have or not have the dual-host function. Therefore, according to configuration data, the device with the active-standby function whether to be configured with the dual-host function can be determined.

Step 902: Determine active-standby configuration of the device with the active-standby function, if the device with the active-standby function is configured into an active device, execute step 903; if the device with the active-standby function is configured into a standby device, execute step 912.

The active-standby configuration can be obtained from the configuration data.

Step 903: Determine whether a heartbeat packet is received, and if yes, execute step 906; otherwise, execute step 904.

The heartbeat packet is a packet that is exchanged between the active device and the standby device, for example, by establishing a TCP or UDP connection, a TCP packet or a UDP packet may be adopted as the heartbeat packet.

Step 904: Wait for set time.

For example, the set time is five minutes.

Step 905: Determine whether the heartbeat packet is received by waiting, and if yes, execute step 906; otherwise, execute step 909.

Step 906: Determine a peer end state according to the heartbeat packet, if the peer end is in an active state, execute step 907; if the peer end is in a standby state or another state, execute step 908.

The heartbeat packet may include state information of a sender, for example, when sending the heartbeat packet, an active device carries information for indicating the active state; when sending the heartbeat packet, a standby device carries information for indicating the standby state. An active-standby state of the peer end may be determined through the information carried in the heartbeat packet. In addition, when the peer end is in an initial state or other state, the heartbeat packet carries other state information which is neither the active state information nor the standby state information, so that it is determined that the peer end is in the other state.

Step 907: Determine that the current state of the device with the active-standby function is the standby state.

Step 908: Determine that the current state of the device with the active-standby function is the active state.

Step 909: Perform an automatic service dialing test and determine whether the automatic service dialing test is successful, and if successful, execute step 910; otherwise, execute step 911.

Through the automatic service dialing test, it may be determined whether the peer end can be used; if successful, it indicates that the peer end can be used, but if there is no heartbeat packet at this time, it indicates that the heartbeat packet is abnormal. When the peer end can be used, the peer end acts as the active device, and the device with the active-standby function needs to be determined to be in the standby state.

In addition, the automatic service dialing test may also not be performed; at this time, when the heartbeat packet is not received by waiting, it is determined that the current state of the device with the active-standby function is the active state.

Step 910: Determine that the current state of the device with the active-standby function is the standby state, and give a heartbeat abnormal alarm.

Step 911: Determine that the current state of the device with the active-standby function is the active state.

Step 912: Determine whether a heartbeat packet is received, and if yes, execute step 915; otherwise, execute step 913.

Step 913: Wait for set time.

For example, the set time is five minutes.

Step 914: Determine whether the heartbeat packet is received by waiting, and if yes, execute step 915; otherwise, execute step 918.

Step 915: Determine a peer end state according to the heartbeat packet, if the peer end is a standby device, execute step 916; if the peer end is in the active state or other state, execute step 917.

Step 916: Determine that the current state of the device with the active-standby function is the active state.

Step 917: Determine that the current state of the device with the active-standby function is the standby state.

Step 918: Perform an automatic service dialing test and determine whether the automatic service dialing test is successful, and if successful, execute step 919; otherwise, execute step 920.

In addition, the automatic service dialing test may also not be performed; at this time, when the heartbeat packet is not received by waiting, it is determined that the current state of the device with the active-standby function is the active state.

Step 919: Determine that the current state of the device with the active-standby function is the standby state.

Step 920: Determine that the current state of the device with the active-standby function is the active state.

Step 921: Start normally as a stand-alone machine.

This embodiment realizes the determination of the active-standby state according to the heartbeat packet. The heartbeat packet is a unicast packet which may be more efficient than a multicast packet, is not limited to hop count, and may be suitable to a case where the active device and standby device are connected through multiple hops, so that remote disaster tolerance is realized.

In the foregoing embodiment, switching of the active device and the standby device may be realized by using the following manner.

Figure 10:
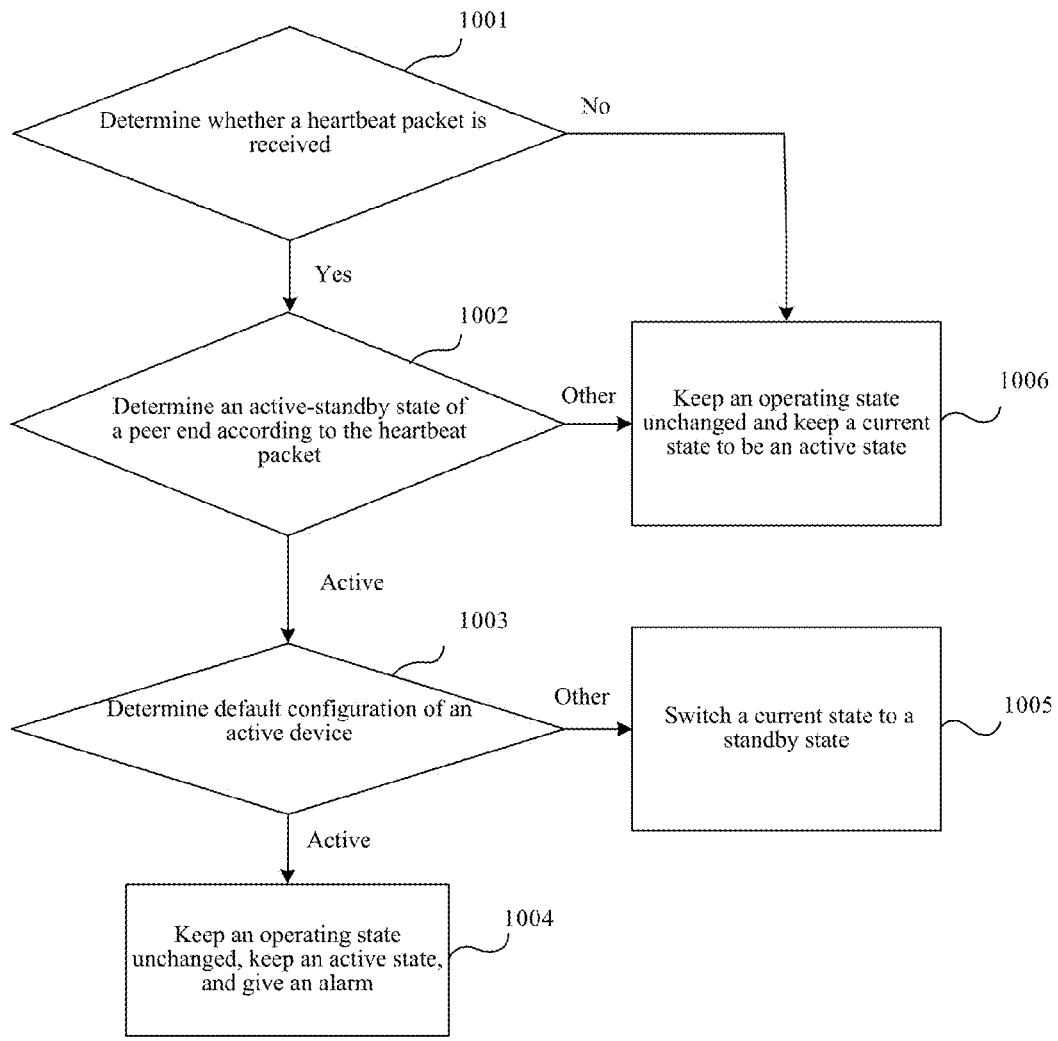
FIG. 10 is a schematic flow chart of switching an active device to a standby device according to an embodiment of the present invention.

FIG. 10 is a schematic flow chart of switching an active device to a standby device according to an embodiment of the present invention, where the procedure is executed by the active device. This embodiment includes:

Step 1001: Determine whether a heartbeat packet is received, and if yes, execute step 1002; otherwise, execute step 1006.

Step 1002: Determine a peer end state according to the heartbeat packet, if a peer end is in an active state, execute step 1003; otherwise, execute step 1006.

Step 1003: Determine configuration of the active device, if the active device is configured into the active state, execute step 1004; otherwise, execute step 1005.

Step 1004: Keep an operating state unchanged, keep the active state, and give an alarm.

Step 1005: Perform active-standby switching, to switch a current state to a standby state.

Step 1006: Keep the operating state unchanged and keep the current state to be the active state.

In this embodiment, according to the heartbeat packet, switching from the active state to the standby state may be realized.

Figure 11:
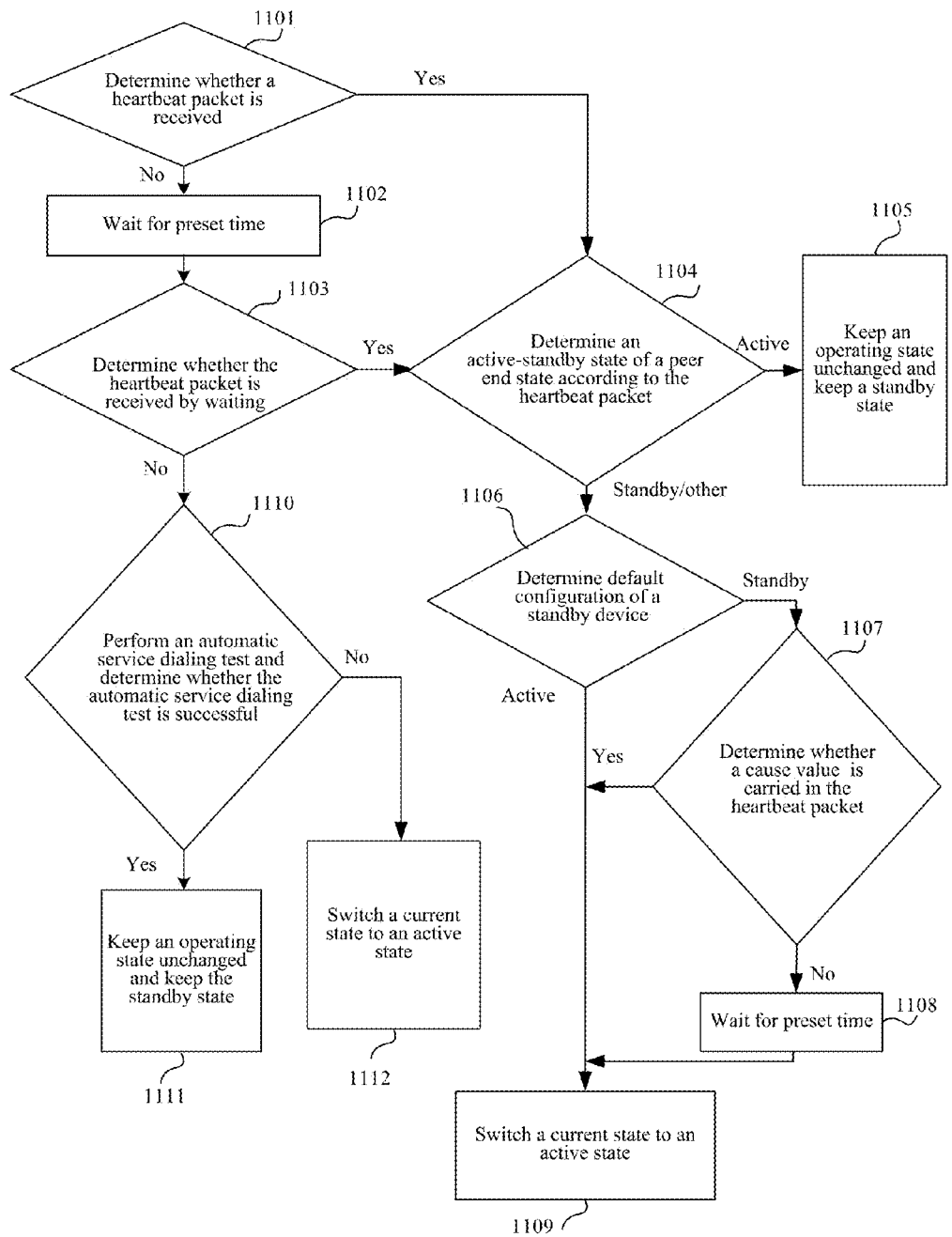
FIG. 11 is a schematic flow chart of switching a standby device to an active device according to an embodiment of the present invention.

FIG. 11 is a schematic flow chart of switching a standby device to an active device according to an embodiment of the present invention. This embodiment is executed by the standby device. This embodiment includes:

Step 1101: Determine whether a heartbeat packet is received, and if yes, execute step 1104; otherwise, execute step 1102.

Step 1102: Wait for preset time.

For example, the preset time is five minutes.

Step 1103: Determine whether the heartbeat packet is received by waiting, and if yes, execute step 1104; otherwise, execute step 1110.

Step 1104: Determine a peer end state according to the heartbeat packet, if a peer end is in an active state, execute step 1105; if the peer end is in a standby state or another state, execute step 1106.

Step 1105: Keep an operating state unchanged and keep the standby state.

Step 1106: Determine configuration of the standby device, if the standby device is configured into the active state, execute step 1109; otherwise, execute step 1107.

Step 1107: Determine whether a cause value, which indicates that the standby state is switched to the active state, is carried in the heartbeat packet, and if yes, execute step 1109; otherwise, execute step 1108.

Step 1108: Wait for preset time. After the preset time expires, execute step 1109.

For example, the preset time is five minutes.

Step 1109: Perform active-standby switching, to switch a current state to the active state.

Step 1110: Perform automatic service dialing test and determine whether the automatic service dialing test is successful, and if successful, execute step 1111; otherwise, execute step 1112.

In addition, the automatic service dialing test may also not be performed; at this time, when the heartbeat packet is not received by waiting, it is determined that the current state of the standby device is the active state.

Step 1111: Keep an operating state unchanged and keep the standby state.

Step 1112: Perform active-standby switching, to switch a current state to the active state.

In this embodiment, according to the heartbeat packet, switching from the standby state to the active state may be realized.

Figure 12:
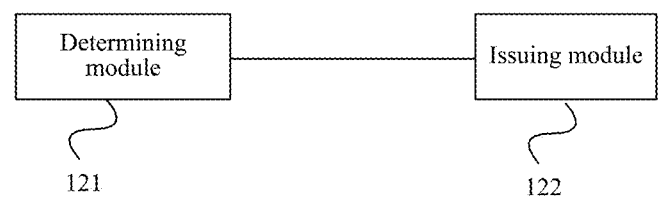
FIG. 12 is a schematic structural diagram of a device for realizing disaster tolerance backup according to the present invention.

FIG. 12 is a schematic structural diagram of a device for realizing disaster tolerance backup according to the present invention, including a determining module 121 and an issuing module 122. The determining module 121 is configured to determine a current state of the device for realizing disaster tolerance backup, where the current state includes an active state or a standby state; the issuing module 122 is configured to: after it is determined that the current state is the active state, issue reachable route information to a connected routing device, where the device for realizing disaster tolerance backup and a device of which a current state is the standby state have a same IP address, the reachable route information includes route information relevant to the IP address, so that the IP address is reachable through a route, and the device for realizing disaster tolerance backup and the device of which the current state is the standby state are backup devices for each other.

Specifically, the issuing module 122 may be configured to issue the route reachable information to the connected routing device; or validate a static route to the connected routing device, so that the route to the connected routing device can be used. For example, activate a BFD session between the device for realizing disaster tolerance backup and the connected routing device; or send first route priority information to the connected routing device, where a priority corresponding to the first route priority information is higher than a priority corresponding to second route priority information, and the second route priority information is issued by a device in the standby state.

The issuing module 122 may be further configured to: after it is determined that the current state is the standby state, issue route unreachable information to the connected routing device or not issue route information; or invalidate the static route to the connected routing device, so that the route to the connected routing device cannot be used. For example, deactivate the BFD session between the device for realizing disaster tolerance backup and the connected routing device; or send the second route priority information to the connected routing device, where the priority corresponding to the second route priority information is lower than the priority corresponding to the first route priority information, and the first route priority information is issued by a device in the active state.

This embodiment further includes: a backup module, configured to: when the current state is the active state, back up in real time to-be-backed-up data to the device of which the current state is the standby state.

When the current state is an initial state, the determining module 121 may be specifically configured to determine the current state of the device for realizing disaster tolerance backup according to at least one of the following items: whether a heartbeat packet is received, a peer end state determined by the received heartbeat packet or an automatic service dialing test result. For example, if the device for realizing disaster tolerance backup is configured into an active device, it is determined whether the heartbeat packet is received; if the heartbeat packet is received, the peer end state is determined according to the heartbeat packet; if the peer end is in the active state, the current state is adjusted to the standby state, otherwise it is determined that the current state is the active state; if the heartbeat packet is not received, it is determined whether the heartbeat packet is received after a delay of preset time, so as to determine the peer end state according to the heartbeat packet after the heartbeat packet is received; if the heartbeat packet is not received by waiting, it is determined that the current state is the active state. If the device for realizing disaster tolerance backup is configured into a standby device, it is determined whether the heartbeat packet is received; if the heartbeat packet is received, the peer end state is determined according to the heartbeat packet; if the peer end state is in the standby state, it is determined that the current state is the active state, otherwise it is determined that the current state is the standby state; if the heartbeat packet is not received, it is determined whether the heartbeat packet is received after a delay of preset time, so as to determine the peer end state according to the heartbeat packet after the heartbeat packet is received by waiting; if the heartbeat packet is not received, it is determined that the current state is the active state. If the heartbeat packet is not received, it may further be determined whether an automatic service dialing test is successful; and if successful, it is determined that the current state is the standby state, otherwise it is determined that the current state is the active state.

When the current state is a state after changing, the determining module 121 may be specifically configured to determine the current state of the device for realizing disaster tolerance backup according to at least one of the following items: a state before changing, whether a heartbeat packet is received, a peer end state determined by the received heartbeat packet, indication information carried in the received heartbeat packet, configuration of the device for realizing disaster tolerance backup or an automatic service dialing test result. For example, if the state before changing is the active state, it is determined whether the heartbeat packet is received; if the heartbeat packet is received, the peer end state is determined according to the heartbeat packet; if the peer end state is not in the active state or the heartbeat packet is not received, the active state is kept unchanged; if the peer end is in the active state, the configuration of the device for realizing disaster tolerance backup is determined; if the device for realizing disaster tolerance backup is configured into an active device, the active state is kept and an alarm is given, and if the device for realizing disaster tolerance backup is configured into a standby device, the current state is adjusted to the standby state. If the state before changing is the standby state, it is determined whether the heartbeat packet is received; if the heartbeat packet is received, the peer end state is determined according to the heartbeat packet; if the peer end state is in the active state, keep the standby state unchanged; if it is determined, according to the heartbeat packet, that the peer end is not in the active state, the configuration of the device for realizing disaster tolerance backup is determined; if the device for realizing disaster tolerance backup is configured into an active device, the current state is adjusted to the active state; if the device for realizing disaster tolerance backup is configured into a standby device, it is determined whether a cause value, which indicates the standby state is switched to the active state, is carried in the heartbeat packet; and if yes, the current state is adjusted to the active state, otherwise, after the preset time expires, the current state is adjusted to the active state; if the heartbeat packet is not received, it is determined whether the heartbeat packet is received after a delay of preset time, so as to determine the peer end state according to the heartbeat packet after the heartbeat packet is received by waiting; if the heartbeat packet is not received by waiting, the current state is adjusted to the active state. If the heartbeat packet is not received, it may further be determined whether an automatic service dialing test is successful; and if successful, the current state is kept to be the standby state, otherwise the current state is adjusted to the active state.

In this embodiment, a device with an active-standby function issues reachable route information to a connected routing device, so that a bearer network is enabled to route a received packet to an active device according to the reachable route information. In this embodiment, the reachable route information is exchanged with a router, where the router belongs to a layer 3 switching device, and the exchanged reachable route information also belongs to layer 3 protocol information. Therefore, it is not required that the active device and the standby device belong to a same layer 2 switching network, and remote disaster tolerance can be realized. In addition, the active device and the standby device in the embodiment of the present invention have a same IP address, so that a problem such as a high capacity requirement for the device and service interruption due to the different IP addresses can be avoided.

Figure 13:
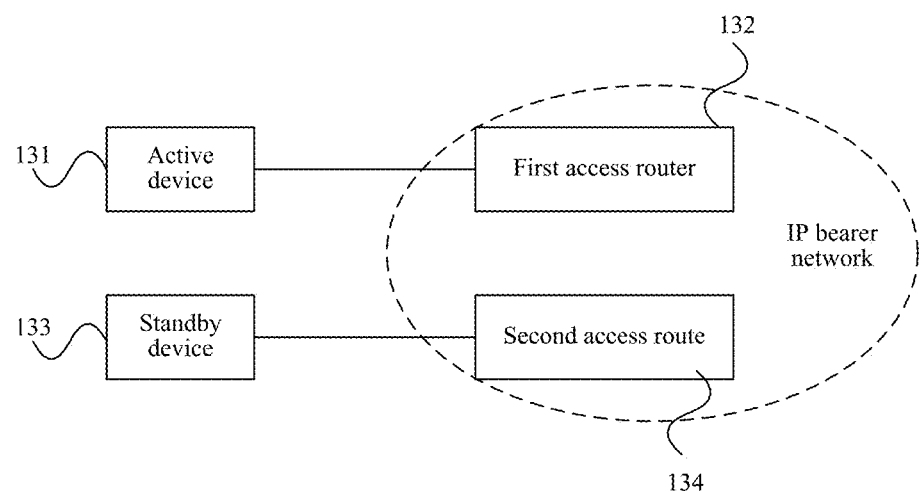
FIG. 13 is a schematic structural diagram of a system for realizing disaster tolerance backup according to the present invention.

FIG. 13 is a schematic structural diagram of a system for realizing disaster tolerance backup according to the present invention, which includes an active device 131 and a first routing device 132 connected to the active device 131. The active device has a same IP address as a standby device having a backup relationship with the active device. The active device 131 is configured to issue reachable route information to the first routing device, where the reachable route information includes route information relevant to the IP address, so that the IP address is reachable through a route. The first routing device 132 is configured to: after receiving the reachable route information, send a received packet to the active device through a path between the active device and the first routing device 132.

In addition, the system may further include a standby device 133 that has the backup relationship with the active device and a second routing device 134 connected to the standby device 133. The standby device 133 is configured to issue route unreachable information to the second routing device or not issue route information; or invalidate a static route to the second routing device, so that the route to the connected routing device cannot be used; or send second route priority information to the second routing device, where a priority corresponding to the second route priority information is lower than a priority corresponding to first route priority information, and the first route priority information is sent by the active device to the first routing device.

The active device 131 and the standby device 132 interwork through a layer 3 network, and are located in different layer 2 switching networks.

In addition, the foregoing routing device may be a router or a layer 3 switch; the first routing device and the second routing device can be different routers, and also can be the same router corresponding to different ports.

The active device may include an issuing module, configured to issue the route reachable information to the connected routing device; or validate a static route to the connected routing device; or send the first route priority information to the connected routing device, where the priority corresponding to the first route priority information is higher than the priority corresponding to second route priority information, and the second route priority information is issued by the standby device.

The active device may include a backup module, configured to back up to-be-backed-up data to the standby device in real time.

In this embodiment, the active device issues the reachable route information to the connected routing device, so that the routing device is enabled to route a received packet to the active device according to the reachable route information. In this embodiment, the reachable route information is exchanged with a router, where the router belongs to a layer 3 switching device, and the exchanged reachable route information also belongs to layer 3 protocol information. Therefore, it is not required that the active device and the standby device belong to a same layer 2 switching network, and remote disaster tolerance can be realized. In addition, the active device and the standby device in the embodiment of the present invention have a same IP address, so that a problem such as a high capacity requirement for the device and service interruption due to the different IP addresses can be avoided.

It can be understood that, related features in the method and device may be referenced to each other. In addition, "first" and "second" in the foregoing embodiments are configured to distinguish embodiments, but do not represent superiority or inferiority of all embodiments.

Persons of ordinary skill in the art may understand that all or part of the steps of the foregoing method embodiments may be implemented by a program instructing relevant hardware. The program may be stored in a computer readable storage medium. When the program is run, the steps of the foregoing method embodiments are performed. The storage medium may be any medium capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they can still make modifications to the technical solutions described in the foregoing embodiments or make equivalent replacements to some technical features of the technical solutions; and such modifications or replacements do not make essence of corresponding technical solutions depart from the spirit and scope of the technical solution of the embodiments of the present invention.

What is claimed is:

1. A method for realizing disaster tolerance backup, the method comprising:
   determining, by a first device with an active-standby function, a current state of the first device with the active-standby function, wherein the current state comprises an active state or a standby state; and
   issuing, by the first device, and in response to determining that the current state is the active state, reachable route information to a connected routing device;
   wherein the first device with the active-standby function and a second device of which a current state is the standby state have a same IP address;
   wherein the reachable route information comprises route information relevant to the IP address, so that the IP address is reachable through a route; and
   wherein the device with the active-standby function and the device of which the current state is the standby state are backup devices for each other.

2. The method according to claim 1, wherein the issuing the reachable route information to the connected routing device comprises performing at least one of:
   issuing route reachable information to the connected routing device; or
   validating a static route to the connected routing device; or
   sending first route priority information to the connected routing device, wherein a priority corresponding to the first route priority information is higher than a priority corresponding to second route priority information, and the second route priority information is issued by the second device in the standby state.

3. The method according to claim 1, further comprising performing, after it is determined that the current state is the standby state, at least one of:
   issuing route unreachable information to the connected routing device or not issuing route information; or
   invalidating a static route to the connected routing device; or
   sending second route priority information to the connected routing device, wherein a priority corresponding to the second route priority information is lower than a priority corresponding to first route priority information, and the first route priority information is issued by the first device in the active state.

4. The method according to claim 1, further comprising:
   when the current state of the first device with the active-standby function is determined to be the active state, backing up in real time to-be-backed-up data to the second device of which the current state is the standby state.

5. The method according to claim 1, wherein the route information relevant to the IP address comprises at least one of route information comprising the IP address, or route information comprising network section information of a network section to which the IP address belongs.

6. The method according to claim 4, wherein the to-be-backed-up data comprises at least one of service data, configuration information, registration information, or call information.

7. The method according to claim 1, wherein the determining the current state of the first device with the active-standby function comprises:
   determining, when the current state is an initial state, the current state of the device with the active-standby function according to at least one of whether a heartbeat packet is received, a peer end state determined by the received heartbeat packet or an automatic service dialing test result.

8. The method according to claim 1, wherein the determining the current state of the device with the active-standby function comprises:
   determining, when the current state is a state after changing, the current state of the first device with the active-standby function according to at least one of a state before changing, whether a heartbeat packet is received, a peer end state determined by the received heartbeat packet, indication information carried in the received heartbeat packet, configuration of the first device with the active-standby function or an automatic service dialing test result.

9. The method according to claim 1, wherein the connected routing device comprises one of a router or a layer 3 switch.

10. A device for realizing disaster tolerance backup, comprising:
    a processor;
    a non-transitory computer readable medium connected to the processor and having stored thereon instructions, that when executed by the processor, cause the processor to:
    determine a current state of the device for realizing disaster tolerance backup, wherein the current state comprises an active state or a standby state; and
    issue reachable route information to a connected routing device after it is determined that the current state is the active state;
    wherein the device for realizing disaster tolerance backup and a second device of which a current state is the standby state have a same IP address;
    wherein the reachable route information comprises route information relevant to the IP address, so that the IP address is reachable through a route; and
    wherein the device for realizing disaster tolerance backup and the second device of which the current state is the standby state are backup devices for each other.

11. The device according to claim 10, wherein the instructions causing the processor to issue reachable route information comprise instructions that, when executed by the processor, cause the processor to perform at least one of:
  issue route reachable information to the connected routing device; or
  validate a static route to the connected routing device; or
  send first route priority information to the connected routing device, wherein a priority corresponding to the first route priority information is higher than a priority corresponding to second route priority information, and the second route priority information is issued by the second device in the standby state.

12. The device according to claim 10, wherein the instructions causing the processor to issue reachable route information comprise instructions that, when executed by the processor, cause the processor to, after it is determined that the current state is the standby state, perform at least one of:
  issue route unreachable information to the connected routing device or not issue route information;
  or invalidate a static route to the connected routing device;
  or send second route priority information to the connected routing device;
  wherein a priority corresponding to the second route priority information is lower than a priority corresponding to first route priority information; and
  wherein the first route priority information is issued by a device in the active state.

13. The device according to claim 10, wherein the non-transitory computer readable medium further has stored thereon instructions that, when executed by the processor, cause the processor to: back up in real time, and when the current state is the active state, to-be-backed-up data to the second device of which the current state is the standby state.

14. The device according to claim 10, wherein the instructions causing the processor to determine the current state of the device further comprise instructions that, when executed by the processor, cause the processor to determine, when the current state is an initial state, the current state of the device for realizing disaster tolerance backup according to at least one of whether a heartbeat packet is received, a peer end state determined by the received heartbeat packet or an automatic service dialing test result.

15. The device according to claim 10, wherein the instructions causing the processor to determine the current state of the device further comprise instructions that, when executed by the processor, cause the processor to determine, when the current state is a state after changing, the current state of the device for realizing disaster tolerance backup according to at least one of a state before changing, whether a heartbeat packet is received, a peer end state determined by the received heartbeat packet, indication information carried in the received heartbeat packet, configuration of the device for realizing disaster tolerance backup or an automatic service dialing test result.

16. A system for realizing disaster tolerance backup, comprising:
  an active device that has a same IP address as a standby device having a backup relationship with the active device; and
  a first routing device connected to the active device;
  wherein the active device is configured to, in response to the active device determining that a current state of the active device is an active state, issue reachable route information to the first routing device, wherein the reachable route information comprises route information relevant to the IP address, so that the IP address is reachable through a route; and
  the first routing device is configured to: after receiving the reachable route information, send a received packet to the active device through a path between the first routing device and the active device.

17. The system according to claim 16, further comprising the standby device that has the backup relationship with the active device, and a second routing device connected to the standby device; wherein
  the standby device is configured to issue route unreachable information to the second routing device or not issue route information; or invalidate a static route to the second routing device; or send second route priority information to the second routing device, wherein a priority corresponding to the second route priority information is lower than a priority corresponding to first route priority information, and the first route priority information is sent by the active device to the first routing device.

18. The system according to claim 16, wherein the active device and the standby device interwork through a layer 3 network, and are located in different layer 2 switching networks.

19. The system according to claim 16, wherein the active device is further configured to perform at least one of:
  issue route reachable information to the connected routing device; or
  validate a static route to the connected routing device; or
  send first route priority information to the connected routing device;
  wherein a priority corresponding to the first route priority information is higher than a priority corresponding to second route priority information; and
  wherein the second route priority information is issued by the standby device.

20. The system according to claim 16, wherein the active device is further configured to back up to-be-backed-up data to the standby device in real time.

* * * * *